United States Patent
Suresh et al.

(10) Patent No.: US 12,321,218 B2
(45) Date of Patent: Jun. 3, 2025

(54) FINE-GRAINED BITCOIN ENGINE DEACTIVATION FOR YIELD RECOVERY, PERFORMANCE, AND/OR POWER MANAGEMENT

(71) Applicant: Intel Corporation, Santa Clara, CA (US)

(72) Inventors: Vikram Suresh, Portland, OR (US); Tao Zhou, Oceanside, CA (US); Shashank Shekhar, San Jose, CA (US); Amitkumar Patel, San Jose, CA (US); Sanu Mathew, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 649 days.

(21) Appl. No.: 17/558,564

(22) Filed: Dec. 21, 2021

(65) Prior Publication Data

US 2023/0195683 A1 Jun. 22, 2023

(51) Int. Cl.
*G06F 1/32* (2019.01)
*G06F 1/3206* (2019.01)
*G06F 1/3287* (2019.01)
*G06F 9/50* (2006.01)

(52) U.S. Cl.
CPC .......... *G06F 1/3287* (2013.01); *G06F 1/3206* (2013.01); *G06F 9/5094* (2013.01)

(58) Field of Classification Search
CPC ..... G06F 1/3287; G06F 1/3206; G06F 9/5094
See application file for complete search history.

(56) References Cited

U.S. PATENT DOCUMENTS

| | | | |
|---|---|---|---|
| 11,055,676 B2 | 7/2021 | Keys et al. | |
| 2017/0242475 A1* | 8/2017 | Gilboa | G06F 1/3237 |
| 2017/0300875 A1* | 10/2017 | Gilboa | G06F 1/324 |
| 2020/0012579 A1 | 1/2020 | Anokhin et al. | |
| 2021/0027223 A1 | 1/2021 | Koide | |
| 2021/0192499 A1 | 6/2021 | Wu et al. | |
| 2023/0195511 A1* | 6/2023 | Suresh | G06F 9/4843 |

FOREIGN PATENT DOCUMENTS

CN 109238758 B 12/2020

* cited by examiner

*Primary Examiner* — Stefan Stoynov
(74) *Attorney, Agent, or Firm* — Nicholson De Vos Webster & Elliott LLP

(57) ABSTRACT

Methods and apparatus relating to techniques utilizing fine-grained bitcoin engine deactivation for yield recovery, performance, and/or power management are described. In an embodiment, a configurable compute tile comprising a plurality of cryptocurrency mining engines. Logic circuitry causes deactivation of one or more cryptocurrency mining engines from the plurality of cryptocurrency mining engines based at least in part on a request for deactivation of the one or more cryptocurrency mining engines. The logic circuitry adjusts a nonce search resolution for one or more active cryptocurrency mining engines of the plurality of cryptocurrency mining engines in response to the request for deactivation. Other embodiments are also disclosed and claimed.

20 Claims, 10 Drawing Sheets

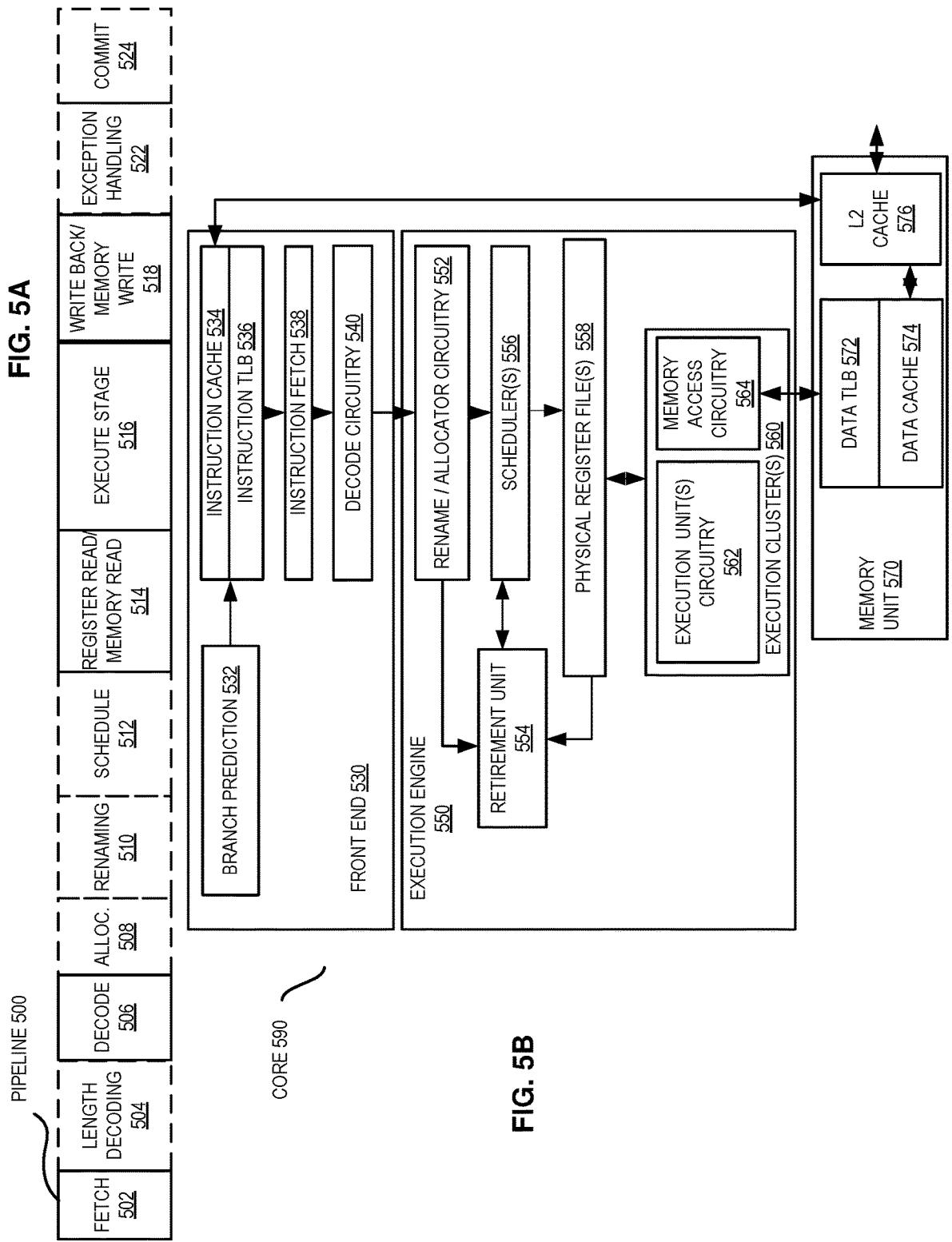

FINE-GRAINED BITCOIN ENGINE DEACTIVATION FOR YIELD RECOVERY, PERFORMANCE, AND/OR POWER MANAGEMENT

FIELD

The present disclosure generally relates to the field of computing systems. More particularly, some embodiments relate to techniques to use fine-grained bitcoin engine deactivation for yield recovery, performance, and/or power management.

BACKGROUND

Digital currencies (also referred to as "cryptocurrencies") are quickly gaining popularity. Bitcoin is currently the most popular digital currency used for peer-to-peer transactions, eliminating the need for intermediate financial institutions by guaranteeing authenticity and user-anonymity using digital signatures. It solves the critical issue of "double spending" using the concept of block chaining, where a public ledger (sometimes also referred to as a "block chain" or "blockchain") captures all the transactions that occur in the digital currency system.

In turn, every block added to the chain validates a new set of transactions by compressing the Merkle root of the transactions along with information including a time stamp, version, target, and the hash of the previous block. Generally, a Merkle root is a simple mathematical way to verify the data on a Merkle tree. Merkle roots are used in cryptocurrency to ensure data blocks passed between peers on a peer-to-peer network are whole, undamaged, and unaltered. The process of validating transactions and computing new blocks of the chain is known as "mining."

BRIEF DESCRIPTION OF THE DRAWINGS

So that the manner in which the herein recited features of the present embodiments can be understood in detail, a more particular description of the embodiments may be had by reference to embodiments, some of which are illustrated in the appended drawings. It is to be noted, however, that the appended drawings illustrate only typical embodiments and are therefore not to be considered limiting of their scope.

FIG. 5A is a block diagram illustrating both an exemplary in-order pipeline and an exemplary register renaming, out-of-order issue/execution pipeline according to embodiments.

FIG. 5B is a block diagram illustrating both an exemplary embodiment of an in-order architecture core and an exemplary register renaming, out-of-order issue/execution architecture core to be included in a processor according to embodiments.

DETAILED DESCRIPTION

Figure 1:
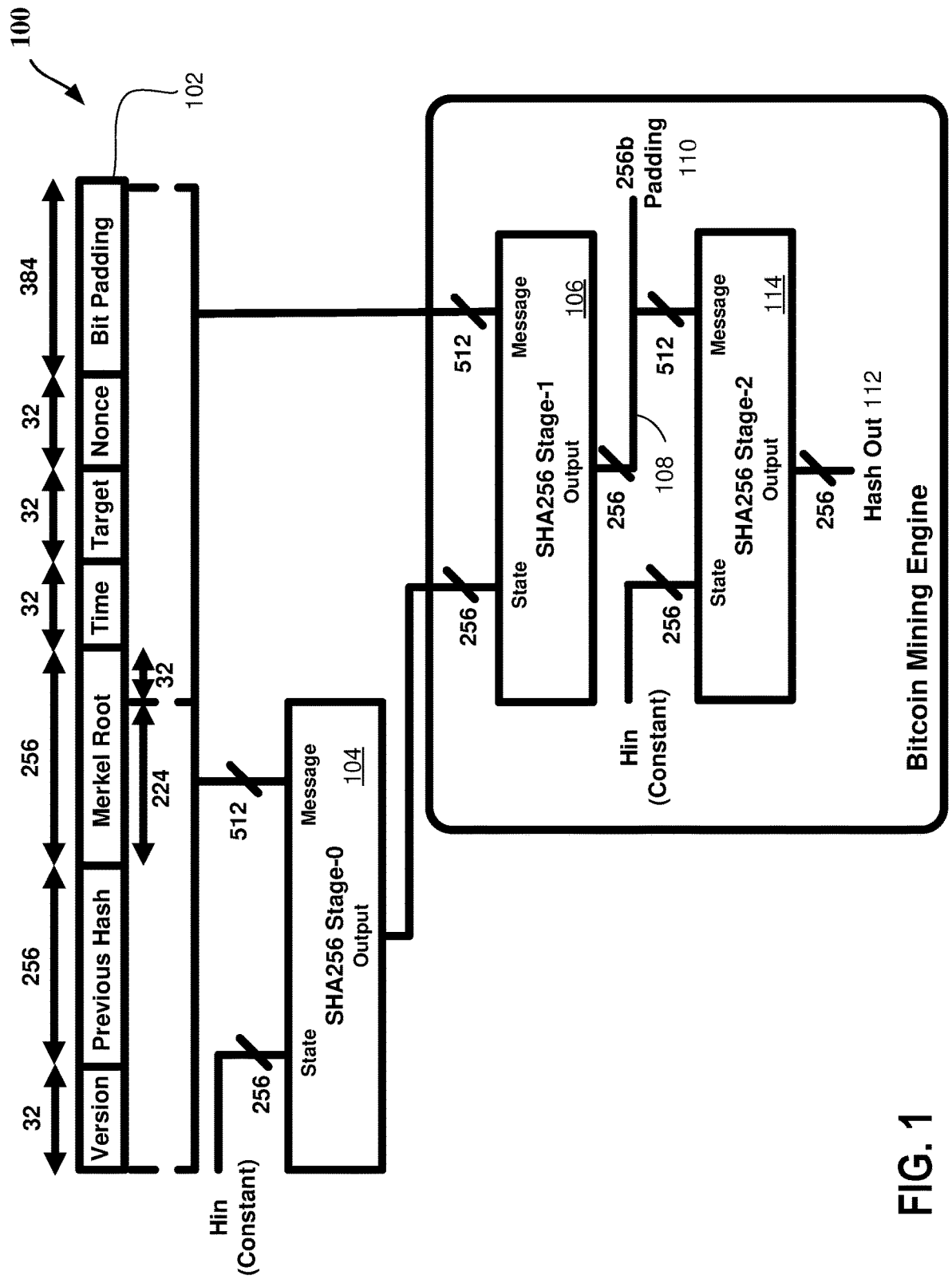
FIG. 1 illustrates a high level block diagram of a Bitcoin mining accelerator system, which may be used in one or more embodiments.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

As mentioned above, creating the public ledger and mining are key operations that ensure a secure implementation for Bitcoins. Moreover, in terms of computing costs, one of the (if not the) most expensive operations in mining involves the computationally intensive task of finding a 32-bit nonce, which when appended to the Merkle root, previous hash, and other headers, produces a 256-bit hash value which is less than a pre-defined threshold value. As discussed herein, a "nonce" generally refers to an arbitrary number that is pseudo-randomly generated and can be used just once in a cryptographic communication. A nonce is often a random or pseudo-random number issued in an authentication protocol, for example, to ensure that old communications cannot be reused in replay attacks. In the case of Bitcoin mining, nonce is used as a pseudorandom input to the proof-of-work workload.

The hashing operation is the largest recurring cost a miner generally incurs in the process of creating a Bitcoin and therefore there is a strong motivation to reduce the energy consumption of this process. To address this issue, some highly parallelizable mining workloads may use dedicated Application Specific Integrated Circuits (ASICs) with many (e.g., hundreds) of mining engines working in parallel.

To this end, some embodiments provide techniques for fine-grained bitcoin engine deactivation for yield recovery, performance, and/or power management. In at least one embodiment, a fine-grained engine deactivation technique leverages the parallelizable nature of mining a workload for yield recovery. The proposed technique(s) may also be used for run-time performance and/or power management by a system controller to regulate ASIC thermal profile and/or debug engine failure(s). The system controller may be coupled to control a plurality of compute engines, e.g., organized into a compute tile. Also, while some embodiments herein are discussed with reference to "Bitcoin," embodiments are not limited to Bitcoin and the techniques discussed herein may be applied to any cryptocurrency, including, for example, Bitcoin, Ethereum, Biance Coin, Tether, Solana, etc.

By contrast, conventional Bitcoin mining ASICs may employ a relatively large array of mining engines, grouped into separate compute tiles. Engine configuration and nonce search resolution are generally fixed at design time. While grouping engines into a common compute tile can reduce the overhead for data interface and control logic, it limits the use of compute resources in the event one or more engines fail in a tile. Hence, such fixed nonce resolution and coarse-grain compute tile deactivation limit run-time flexibility (e.g., for the system, software, firmware, etc.) to regulate ASIC power consumption and/or performance.

In at least one embodiment, engine deactivation enables the mining system controller and/or engine configuration logic of a compute tile to individually activate/deactivate each engine. The engine configuration may also control the nonce step resolution for the activated engines in a compute tile, thereby not affecting nonce search coverage. As discussed herein, a nonce "search" generally refers to the search range, which is $2^{32}$ in an embodiment, whereas a nonce "step" generally refers to how each engine increments the nonce values. For instance, in a two-engine tile, one engine may search all odd nonces and the other engine may search all even nonces. In this example, both engines may increment their nonces in steps of "2." Fine-grained engine deactivation may further allow the system software to regulate ASIC performance for debug mode and/or to control spatial workload distribution for a more uniform thermal management.

Additionally, some embodiments may be applied in computing systems that include one or more processors (e.g., where the one or more processors may include one or more processor cores), such as those discussed with reference to FIG. 1 et seq., including for example a desktop computer, a workstation, a computer server, a server blade, or a mobile computing device. The mobile computing device may include a smartphone, tablet, Ultra-Mobile Personal Computer (UMPC), laptop computer, Ultrabook™ computing device, wearable devices (such as a smart watch, smart ring, smart bracelet, or smart glasses), etc.

FIG. 1 illustrates a high level block diagram of a Bitcoin mining accelerator system 100, which may be used in one or more embodiments. The Bitcoin mining process starts with a 1024-bit message 102 including a 32-bit version value, 256-bit hash from the previous block, 256-bit Merkle root of the transaction, 32-bit time stamp, 32-bit target value, 32-bit nonce and a 384-bit padding, e.g., per the SHA-256 specification (where "SHA" refers to Secure Hash Algorithm and "SHA-256" refers to SHA, 256-bits). The 1024-bit message 102 is compressed using two stages of 64-round SHA-256 (stage-0 104 and stage-1 106) to generate a 256 bit hash 108. This is padded with a 256-bit constant 110 and is compressed again at stage-2 (114) to obtain the final 256-bit hash 112. The initial state for this stage of compression is hard-wired to the default state per SHA2 specification (denoted as "Hin(Constant)" in the figures).

The process of mining includes identifying a nonce for a given header which generates a final hash that is less than a pre-defined target. This is often achieved by looking for a minimum number of leading zeros that would ensure the hash to be smaller than the target. The target (and hence the leading zero requirement) changes depending on the rate of new block creation to maintain the rate at one block every ten minutes, for example. Decreasing the target decreases the probability of finding a valid hash and hence increases the overall search space to generate a new block for the chain.

For a given header, the mining accelerator sweeps through the search space of $2^{32}$ options to potentially find a valid nonce. If no valid nonce is found, the Merkle root may be changed by choosing a different set of pending transactions and starting over with the nonce search. The SHA256 Stage-0 is performed once per Merkle root and can be implemented either in logic such as by a one-time hashing hardware accelerator, software, or combinations thereof. The nonce space exploration in SHA256 Stage-1 (106) and Stage-2 (114) are implemented as fully unrolled 64 rounds of SHA256 message digest and parallel message expansion logic. Each stage of SHA256 includes 64-rounds each of message digest and message scheduler logic.

Figure 2:
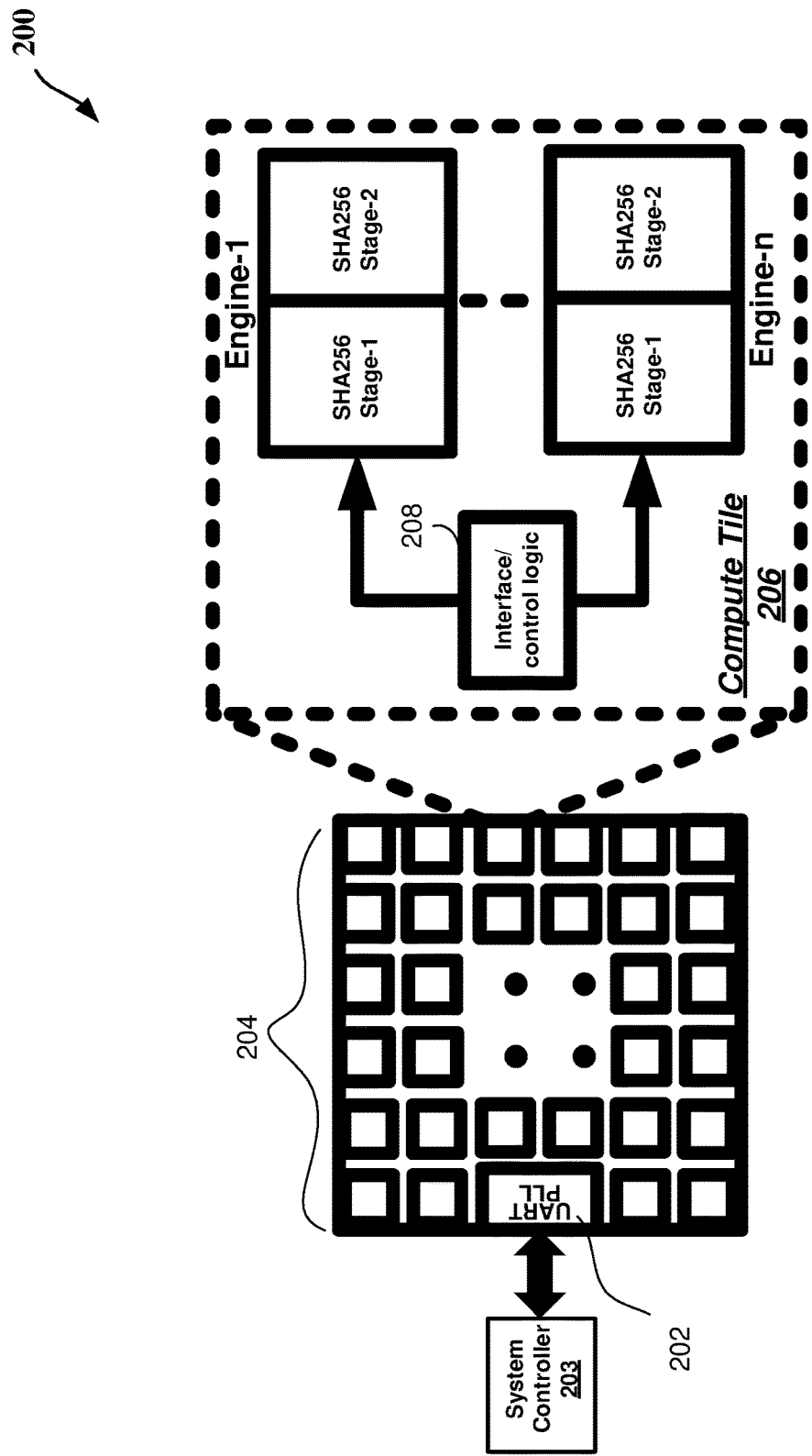
FIG. 2 illustrates a high level block diagram of a Bitcoin mining Application Specific Integrated Circuit (ASIC) architecture, which may be used in one or more embodiments.

FIG. 2 illustrates a high level block diagram of a Bitcoin mining ASIC architecture 200, which may be used in one or more embodiments. A Bitcoin mining ASIC may include a global interface such as a Universal Asynchronous Receiver-Transmitter (UART) and a clock source such as a Phase-Locked Loop (PLL) 202 to communicate with a system controller 203, along with an array of mining engines accelerating the two stages of SHA256 (204). As discussed herein, a "UART" generally refers to a computer hardware device for asynchronous serial communication in which the data format and transmission speeds are configurable. The mining engines are in turn grouped into compute tiles (206) with a shared interface and control logic 208.

Figure 3:
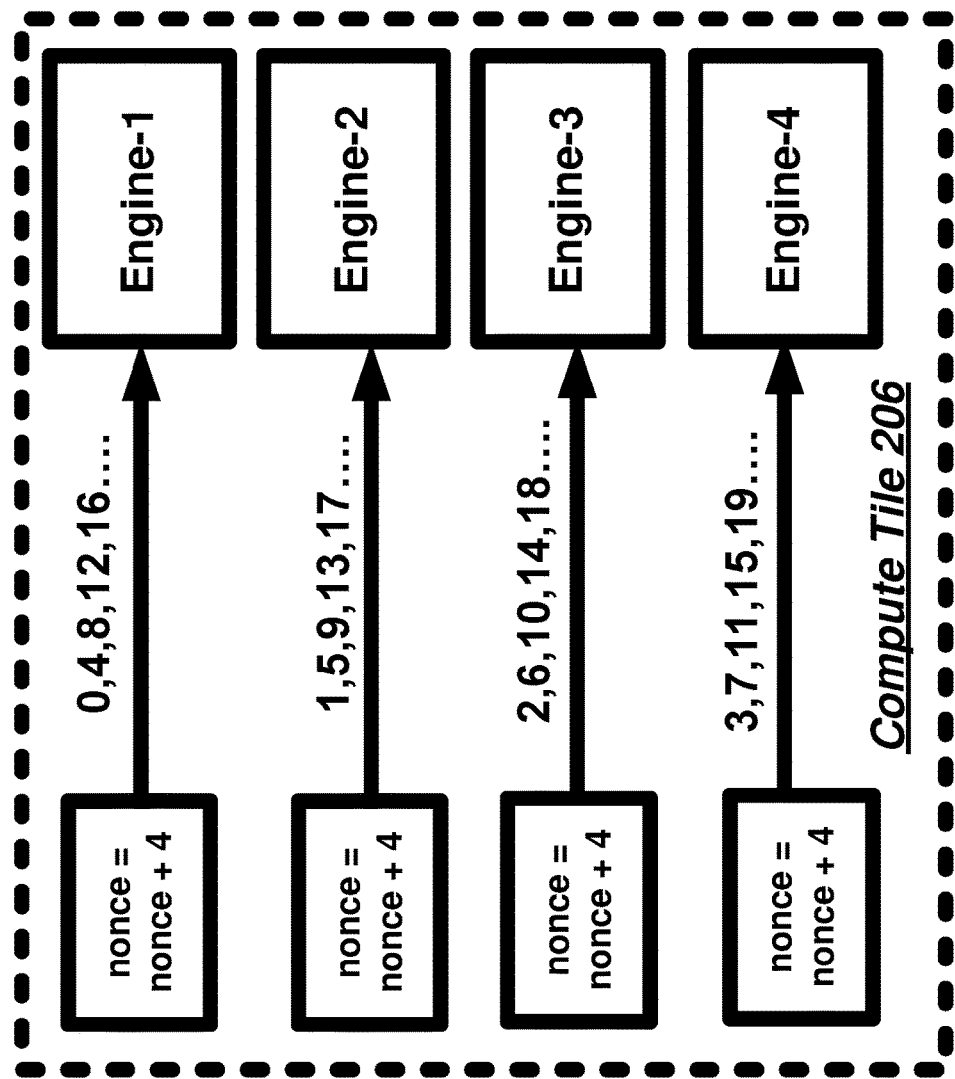
FIG. 3 illustrates a high level block diagram of a Bitcoin mining compute tile organization, which may be used in one or more embodiments.

FIG. 3 illustrates a high level block diagram of a Bitcoin mining compute tile organization 300, which may be used in one or more embodiments. Assuming each compute tile includes four mining engines, the four engines split the whole nonce space search with fixed nonce step resolution (see, e.g., FIG. 3 where a step resolution of four is used). In this instance, engine-1 computes the hash for nonce 0, 4, 8, 12 and so on. In such a fixed configuration, in the event of a defective engine, the compute tile will be unable to perform the whole nonce space search for a given workload. As a result, either the search space has to be compromised or the entire compute tile needs to be disabled, resulting in yield loss and ASIC performance degradation.

One way to alleviate this issue is to group fewer mining engines per compute tile. While this may reduce yield loss, it increases the overhead for interface and control logic required for the larger number of compute tiles to support the same number of mining engines—directly affecting silicon area and energy-efficiency.

Figure 4A:
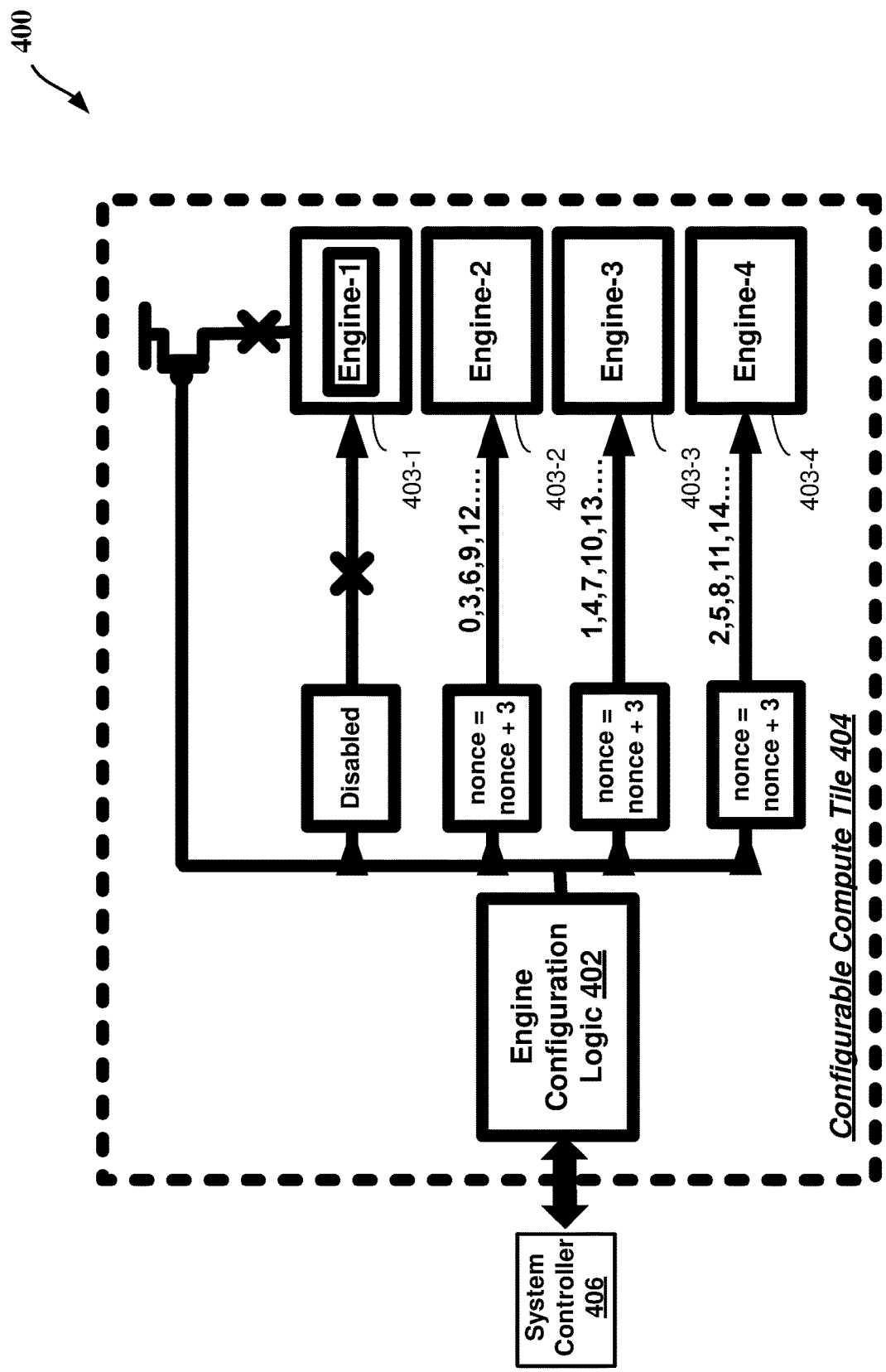
FIG. 4A illustrates a high level block diagram of a configurable Bitcoin mining compute tile organization, in accordance with an embodiment.

FIG. 4A illustrates a high level block diagram of a configurable Bitcoin mining compute tile organization 400, in accordance with an embodiment. An engine configuration logic 402 allows for fine-grained engine activation/deactivation of one or more (or even all) engines (e.g., engines 403-1, 403-2, 403-3, and 404-4 in FIG. 4) in a configurable compute tile 404. In an embodiment, each compute tile is configurable to activate/deactivate a set number of mining engines (see, e.g., FIG. 4). The system controller logic 406 can cause configuration of each compute tile individually, e.g., to effectively control activation/deactivation of every mining engine.

Figure 4B:
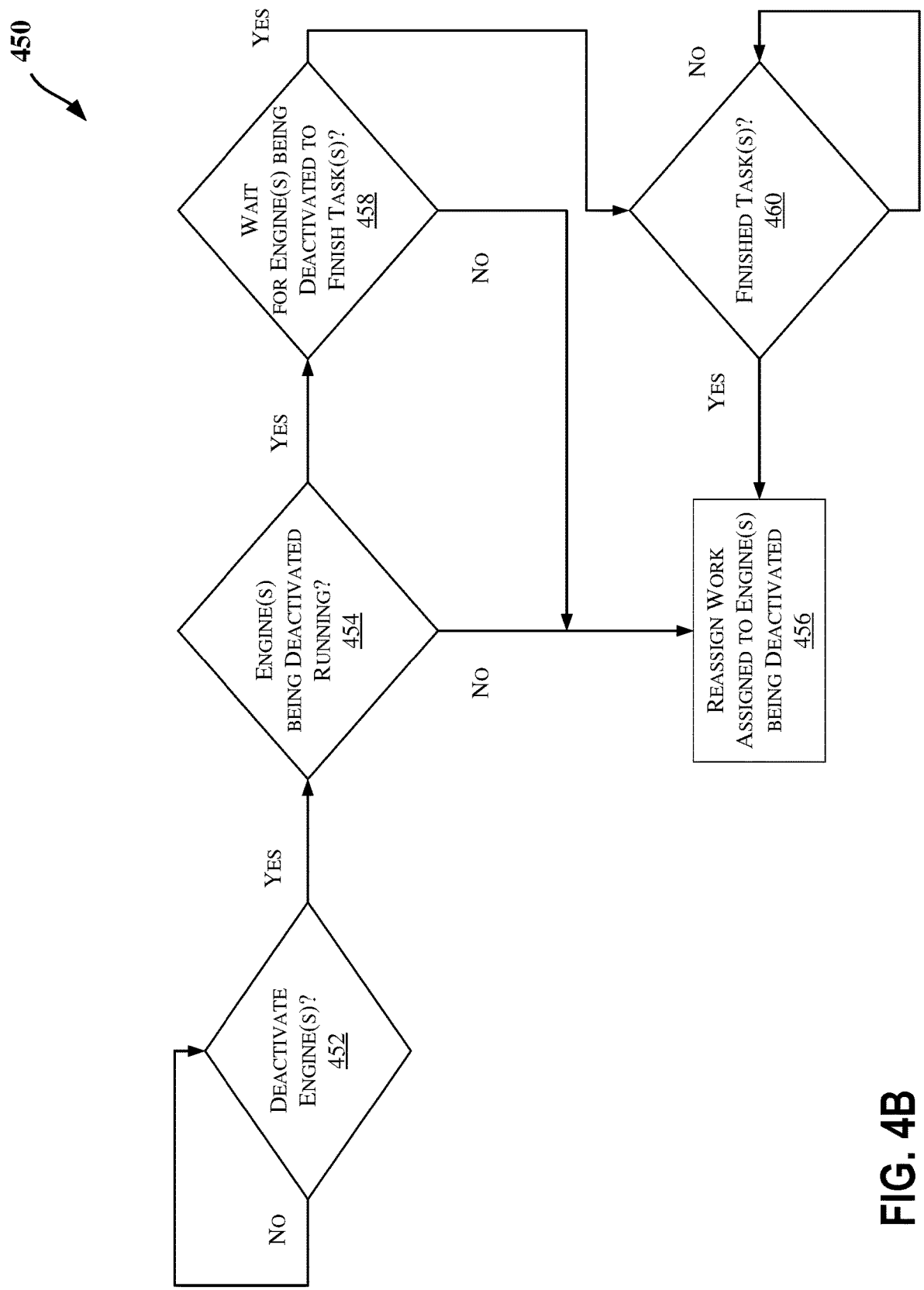
FIG. 4B illustrates a flow diagram of a method to provide fine-grained cryptocurrency engine deactivation for yield recovery, performance, and/or power management, according to some embodiments.

FIG. 4B illustrates a flow diagram of a method 450 to provide fine-grained cryptocurrency engine deactivation for yield recovery, performance, and/or power management, according to some embodiments. One or more of the operations of the method 450 may be performed by one or more components of FIGS. 1-4A, such as system controller, engine configuration logic, other logic including a processor, processor core, or other logic circuitry within a processor or processor core.

Referring to FIGS. 1-4B, an operation 452 determines whether one or more engines in a compute tile 404 are to be deactivated. Various reasons could trigger deactivation of an engine. For example, the deactivation determination of operation 452 may be based on one or more of: yield recovery, performance, and/or power management. An operation 454 determines whether the engine(s) being deactivated are running. If not, operation 456 reassigns the work that was assigned to or was intended/planned to be assigned to the engine that is being deactivated. If the engine being deactivated is running a task, at operation 458, it is determined whether to wait for that engine to finish its task(s). For example, if the engine is determined to be generating incorrect results, there is no need to wait for the engine to perform any additional function and it can be shut down immediately (i.e., continuing at operation 456). Otherwise, method 450 waits for the ending to finish its task(s) as determined at an operation 460. After finishing the task(s) at operation 460, method 450 resumes at operation 456.

In an embodiment, the deactivation determination of operation 452 may be triggered due to a detected failure. As discussed herein, failure of an engine generally refers to an engine being unable to return results, return results within an expected period, or return invalid or return results. This could be due to manufacturing defects or devices not being fast enough for the target frequency. In an embodiment, the system controller 406 and/or the engine configuration logic 402 may detect engine failure.

Moreover, the nonce step resolution for each engine may then be determined based on the number of active engines in the corresponding compute tile. As a result, in the event of a defective engine, the system controller 406 and/or the engine configuration logic 402 may cause disabling of only the engine that is defective, while leveraging the rest of the functional engines in the compute tile 404. The nonce space for a given workload may then be distributed equally among the active engines and, hence, does not result in any loss in nonce search space. For instance, if engine-1 (of FIG. 4A) is defective (e.g., as shown in FIG. 4A with a X), that engine is disabled and the nonce step of the remaining engines can be configured to be equal to 3, i.e., engine-2 now steps through nonce values of 0, 3, 6, 9 and so on.

Further, Bitcoin mining engines may typically operate in the 300-400 mV range to achieve high energy-efficiency. As a result, leakage power constitutes a considerable portion of the total ASIC power, compared to typical chip operating voltages of >600 mV, for example. To enable reliable low-voltage operation, lower threshold voltage transistors may predominantly be used, further increasing the percentage of leakage power (e.g., approximately 15% from silicon measurements). In an embodiment, the deactivation determination of operation 452 may be triggered by power savings consideration, e.g., in response to a power consumption reduction request. For example, the engine deactivation control may also be used to power-gate the inactive engine (s), saving valuable leakage power in some embodiments.

In an embodiment, the deactivation determination of operation 452 may be triggered for a performance tuning purpose (or in response to a performance tuning request). Moreover, fine-grained engine deactivation may allow the mining system to tune each ASIC for the best possible operating frequency in an embodiment. For example, during system power-on or start-up, the system software/logic (e.g., including an Operating System (OS), a Basic Input/Output System (BIOS), a device driver, a software application, etc.) may test the performance of each compute tile to determine the most optimized frequency setting in the common PLL on the ASIC (e.g., PLL 202 of FIG. 2). Depending on the performance gradient, some of the compute tiles (or selective engines in one or more tiles) may be deactivated to allow the remaining tiles (or engines) to operate at a higher frequency and, hence, achieve a better net hash rate. Moreover, fine-grained engine deactivation may also allow faster engines in all compute tiles to be selectively activated to achieve higher net throughput at the ASIC level. To determine which engines and/or compute tiles are faster, during system power-on, compute tiles and/or engines may be selectively deactivated and active engine(s) or compute tile(s) tested for speed and operation in one embodiment.

In another embodiment, the deactivation determination of operation 452 may be triggered for power and/or thermal tuning. Bitcoin mining ASICs generally operate under strict power/thermal budget. In the event of a thermal event (such as detection of a temperature above a threshold value), the fine-grained deactivation can be used in accordance with one embodiment to reduce the ASIC power consumption, e.g., while regulating the ASIC thermal profile uniformly across the chip. The regulation can be done without deactivating whole compute tiles and/or without running a complete nonce space search. For example, diagrams of FIGS. 3 and 4A discuss step resolutions of four and three, but embodiments are not limited to these values and even step resolutions of one (or some other value) can be used depending on the implementation.

In yet another embodiment, fine-grained engine deactivation (e.g., as discussed with reference to method 450) allows more engines to be grouped into a single compute tile since engines can be selectively deactivated (whereas the existing techniques would have to deactivate whole tiles which would be wasteful). In this fashion, the cost of shared interface and control logic is amortized across a larger number of mining engines, thereby reducing silicon area and improving energy-efficiency.

Additionally, some embodiments may be applied in computing systems that include one or more processors (e.g., where the one or more processors may include one or more processor cores), such as those discussed with reference to FIG. 1 et seq., including for example a desktop computer, a workstation, a computer server, a server blade, or a mobile computing device. The mobile computing device may include a smartphone, tablet, Ultra-Mobile Personal Computer (UMPC), laptop computer, Ultrabook™ computing device, wearable devices (such as a smart watch, smart ring, smart bracelet, or smart glasses), etc. As an example, one or more processors or processor cores may be used to provide the mining engines and/or logic/controllers discussed with reference to FIGS. 1-4B.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing;

and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

FIG. 5A is a block diagram illustrating both an exemplary in-order pipeline and an exemplary register renaming, out-of-order issue/execution pipeline according to embodiments. FIG. 5B is a block diagram illustrating both an exemplary embodiment of an in-order architecture core and an exemplary register renaming, out-of-order issue/execution architecture core to be included in a processor according to embodiments. The solid lined boxes in FIGS. 5A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 5A, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524.

FIG. 5B shows processor core 590 including a front end unit 530 coupled to an execution engine unit 550, and both are coupled to a memory unit 570. The core 590 may be a reduced instruction set computing (RISC) core, a complex instruction set computing (CISC) core, a very long instruction word (VLIW) core, or a hybrid or alternative core type. As yet another option, the core 590 may be a special-purpose core, such as, for example, a network or communication core, compression engine, coprocessor core, general purpose computing graphics processing unit (GPGPU) core, graphics core, or the like.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (or decoder) may decode instructions, and generate as an output one or more micro-operations, micro-code entry points, microinstructions, other instructions, or other control signals, which are decoded from, or which otherwise reflect, or are derived from, the original instructions. The decode unit 540 may be implemented using various different mechanisms. Examples of suitable mechanisms include, but are not limited to, look-up tables, hardware implementations, programmable logic arrays (PLAs), microcode read only memories (ROMs), etc. In one embodiment, the core 590 includes a microcode ROM or other medium that stores microcode for certain macroinstructions (e.g., in decode unit 540 or otherwise within the front end unit 530). The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations, central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 558 comprises a vector registers unit, a writemask registers unit, and a scalar registers unit. These register units may provide architectural vector registers, vector mask registers, and general purpose registers. The physical register file(s) unit(s) 558 is overlapped by the retirement unit 554 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which includes a data TLB unit 572 coupled to a data cache unit 574 coupled to a level 2 (L2) cache unit 576. In one exemplary embodiment, the memory access units 564 may include a load unit, a store address unit, and a store data unit, each of which is coupled to the data TLB unit 572 in the memory unit 570. The instruction cache unit 534 is further coupled to a level 2 (L2) cache unit 576 in the memory unit 570. The L2 cache unit 576 is coupled to one or more other levels of cache and eventually to a main memory.

By way of example, the exemplary register renaming, out-of-order issue/execution core architecture may implement the pipeline 500 as follows: 1) the instruction fetch 538 performs the fetch and length decoding stages 502 and 504; 2) the decode unit 540 performs the decode stage 506; 3) the rename/allocator unit 552 performs the allocation stage 508 and renaming stage 510; 4) the scheduler unit(s) 556 performs the schedule stage 512; 5) the physical register file(s) unit(s) 558 and the memory unit 570 perform the register read/memory read stage 514; the execution cluster 560 perform the execute stage 516; 6) the memory unit 570 and the physical register file(s) unit(s) 558 perform the write back/memory write stage 518; 7) various units may be involved in the exception handling stage 522; and 8) the retirement unit 554 and the physical register file(s) unit(s) 558 perform the commit stage 524.

The core 590 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 590 includes logic to support a packed data instruction set extension (e.g., AVX1, AVX2), thereby allowing the operations used by many multimedia applications to be performed using packed data.

Figure 6:
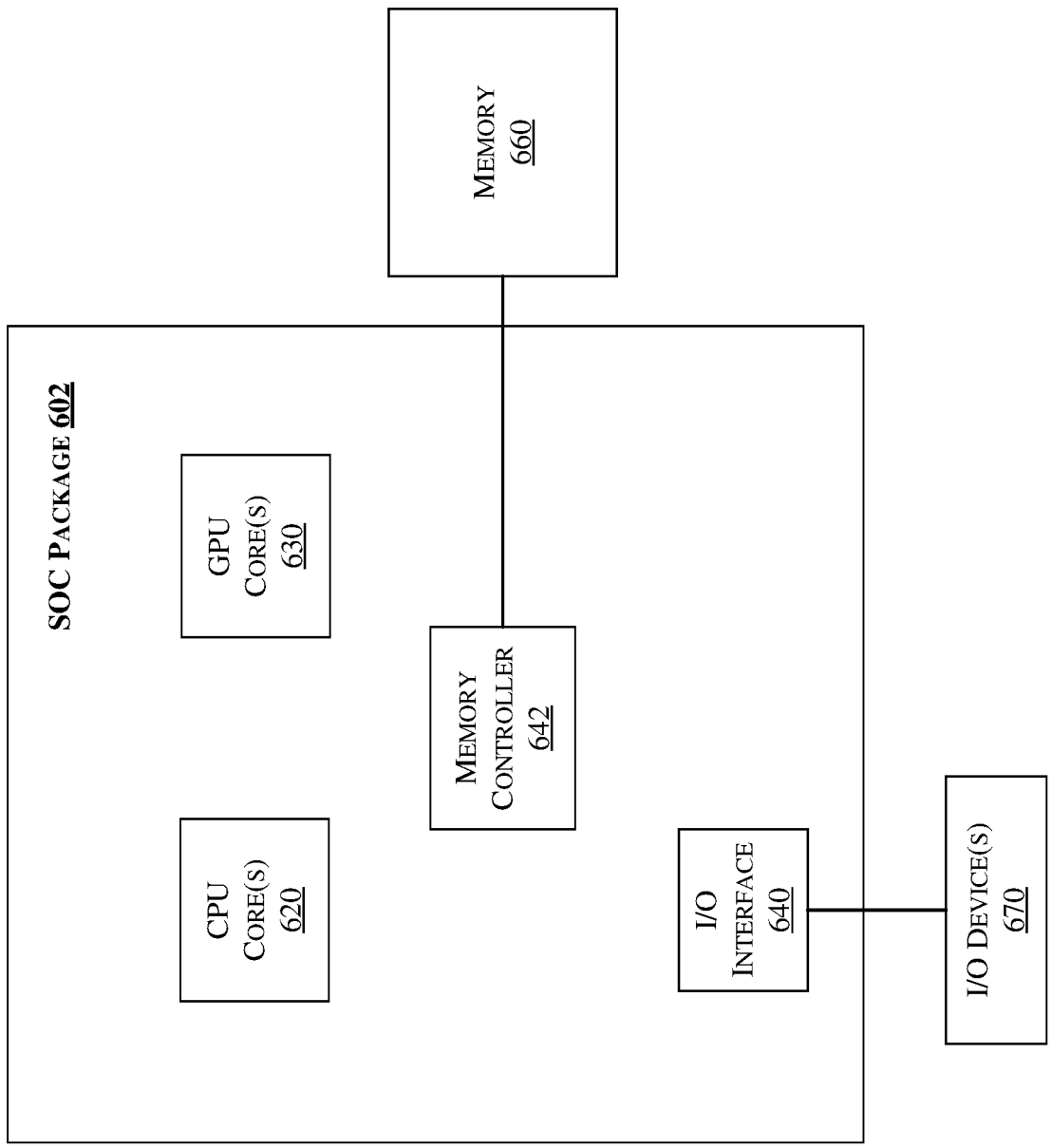
FIG. 6 illustrates a block diagram of an SOC (System On Chip) package in accordance with an embodiment.

FIG. 6 illustrates a block diagram of an SOC package in accordance with an embodiment. As illustrated in FIG. 6, SOC 602 includes one or more Central Processing Unit (CPU) cores 620, one or more Graphics Processor Unit (GPU) cores 630, an Input/Output (I/O) interface 640, and a memory controller 642. Various components of the SOC package 602 may be coupled to an interconnect or bus such as discussed herein with reference to the other figures. Also, the SOC package 602 may include more or less components, such as those discussed herein with reference to the other figures. Further, each component of the SOC package 602 may include one or more other components, e.g., as discussed with reference to the other figures herein. In one embodiment, SOC package 602 (and its components) is provided on one or more Integrated Circuit (IC) die, e.g., which are packaged into a single semiconductor device.

As illustrated in FIG. 6, SOC package 602 is coupled to a memory 660 via the memory controller 642. In an embodiment, the memory 660 (or a portion of it) can be integrated on the SOC package 602.

The I/O interface 640 may be coupled to one or more I/O devices 670, e.g., via an interconnect and/or bus such as discussed herein with reference to other figures. I/O device(s) 670 may include one or more of a keyboard, a mouse, a touchpad, a display, an image/video capture device (such as a camera or camcorder/video recorder), a touch screen, a speaker, or the like.

Figure 7:
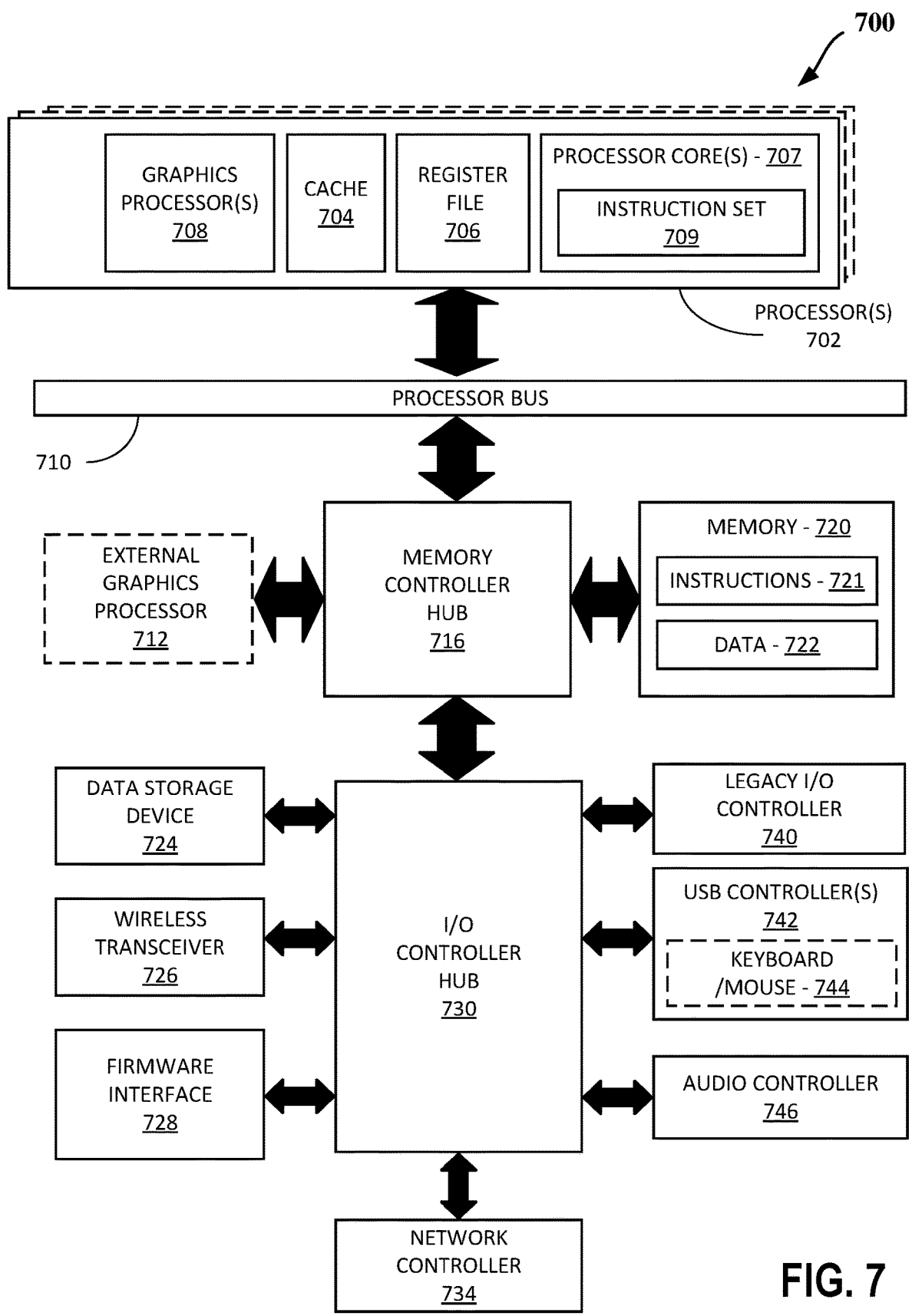
FIG. 7 is a block diagram of a processing system, according to an embodiment.

FIG. 7 is a block diagram of a processing system 700, according to an embodiment. In various embodiments the system 700 includes one or more processors 702 and one or more graphics processors 708, and may be a single processor desktop system, a multiprocessor workstation system, or a server system having a large number of processors 702 or processor cores 707. In on embodiment, the system 700 is a processing platform incorporated within a system-on-a-chip (SoC or SOC) integrated circuit for use in mobile, handheld, or embedded devices.

An embodiment of system 700 can include, or be incorporated within a server-based gaming platform, a game console, including a game and media console, a mobile gaming console, a handheld game console, or an online game console. In some embodiments system 700 is a mobile phone, smart phone, tablet computing device or mobile Internet device. Data processing system 700 can also include, couple with, or be integrated within a wearable device, such as a smart watch wearable device, smart eyewear device, augmented reality device, or virtual reality device. In some embodiments, data processing system 700 is a television or set top box device having one or more processors 702 and a graphical interface generated by one or more graphics processors 708.

In some embodiments, the one or more processors 702 each include one or more processor cores 707 to process instructions which, when executed, perform operations for system and user software. In some embodiments, each of the one or more processor cores 707 is configured to process a specific instruction set 709. In some embodiments, instruction set 709 may facilitate Complex Instruction Set Computing (CISC), Reduced Instruction Set Computing (RISC), or computing via a Very Long Instruction Word (VLIW). Multiple processor cores 707 may each process a different instruction set 709, which may include instructions to facilitate the emulation of other instruction sets. Processor core 707 may also include other processing devices, such a Digital Signal Processor (DSP).

In some embodiments, the processor 702 includes cache memory 704. Depending on the architecture, the processor 702 can have a single internal cache or multiple levels of internal cache. In some embodiments, the cache memory is shared among various components of the processor 702. In some embodiments, the processor 702 also uses an external cache (e.g., a Level-3 (L3) cache or Last Level Cache (LLC)) (not shown), which may be shared among processor cores 707 using known cache coherency techniques. A register file 706 is additionally included in processor 702 which may include different types of registers for storing different types of data (e.g., integer registers, floating point registers, status registers, and an instruction pointer register). Some registers may be general-purpose registers, while other registers may be specific to the design of the processor 702.

In some embodiments, processor 702 is coupled to a processor bus 710 to transmit communication signals such as address, data, or control signals between processor 702 and other components in system 700. In one embodiment the system 700 uses an exemplary 'hub' system architecture, including a memory controller hub 716 and an Input Output (I/O) controller hub 730. A memory controller hub 716 facilitates communication between a memory device and other components of system 700, while an I/O Controller Hub (ICH) 730 provides connections to I/O devices via a local I/O bus. In one embodiment, the logic of the memory controller hub 716 is integrated within the processor.

Memory device 720 can be a dynamic random access memory (DRAM) device, a static random access memory (SRAM) device, flash memory device, phase-change memory device, or some other memory device having suitable performance to serve as process memory. In one embodiment the memory device 720 can operate as system memory for the system 700, to store data 722 and instructions 721 for use when the one or more processors 702 executes an application or process. Memory controller hub 716 also couples with an optional external graphics processor 712, which may communicate with the one or more graphics processors 708 in processors 702 to perform graphics and media operations.

In some embodiments, ICH 730 enables peripherals to connect to memory device 720 and processor 702 via a high-speed I/O bus. The I/O peripherals include, but are not limited to, an audio controller 746, a firmware interface 728, a wireless transceiver 726 (e.g., Wi-Fi, Bluetooth), a data storage device 724 (e.g., hard disk drive, flash memory, etc.), and a legacy I/O controller 740 for coupling legacy (e.g., Personal System 2 (PS/2)) devices to the system. One or more Universal Serial Bus (USB) controllers 742 connect input devices, such as keyboard and mouse 744 combinations. A network controller 734 may also couple to ICH 730. In some embodiments, a high-performance network controller (not shown) couples to processor bus 710. It will be appreciated that the system 700 shown is exemplary and not limiting, as other types of data processing systems that are differently configured may also be used. For example, the I/O controller hub 730 may be integrated within the one or more processor 702, or the memory controller hub 716 and I/O controller hub 730 may be integrated into a discreet external graphics processor, such as the external graphics processor 712.

Figure 8:
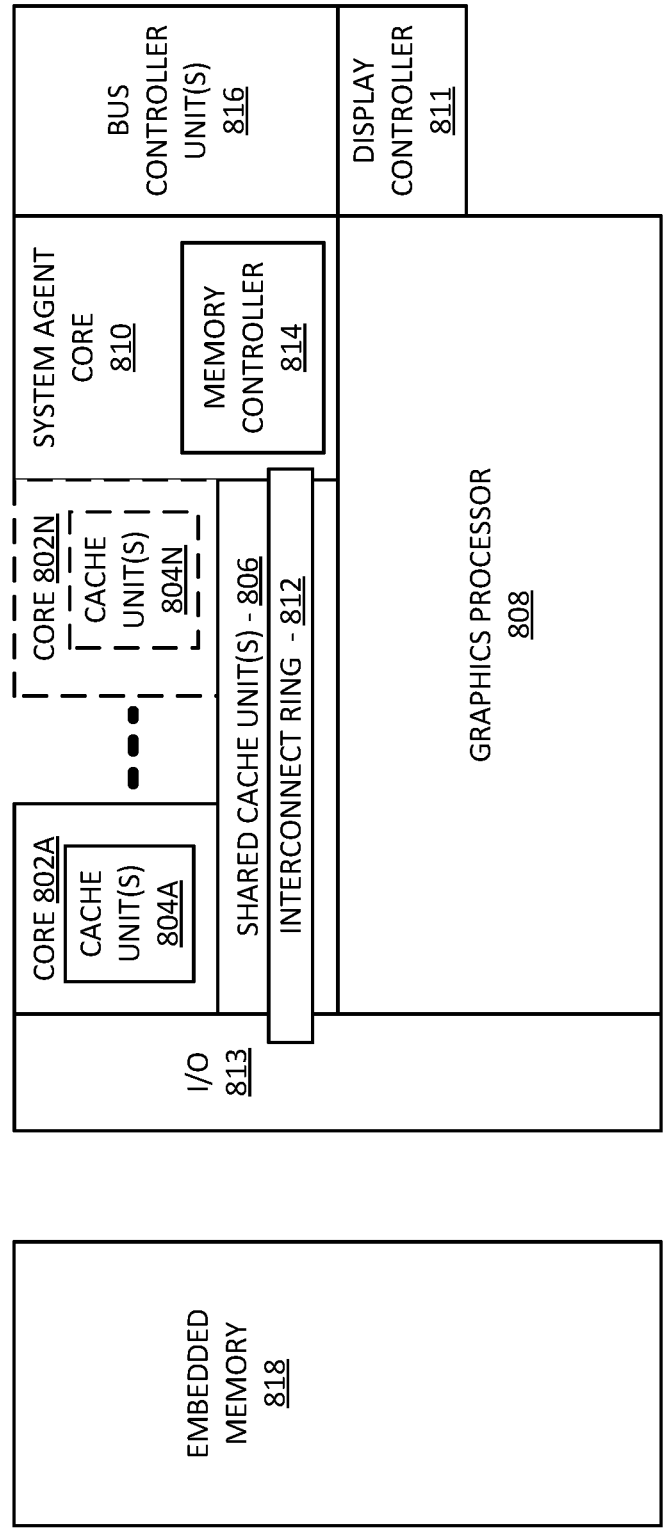
FIG. 8 is a block diagram of an embodiment of a processor having one or more processor cores, according to some embodiments.

FIG. 8 is a block diagram of an embodiment of a processor 800 having one or more processor cores 802A to 802N, an integrated memory controller 814, and an integrated graphics processor 808. Those elements of FIG. 8 having the same reference numbers (or names) as the elements of any other figure herein can operate or function in any manner similar to that described elsewhere herein, but are not limited to such. Processor 800 can include additional cores up to and including additional core 802N represented by the dashed lined boxes. Each of processor cores 802A to 802N includes one or more internal cache units 804A to 804N. In some embodiments each processor core also has access to one or more shared cached units 806.

The internal cache units 804A to 804N and shared cache units 806 represent a cache memory hierarchy within the processor 800. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 806 and 804A to 804N.

In some embodiments, processor 800 may also include a set of one or more bus controller units 816 and a system agent core 810. The one or more bus controller units 816 manage a set of peripheral buses, such as one or more Peripheral Component Interconnect buses (e.g., PCI, PCI Express). System agent core 810 provides management functionality for the various processor components. In some embodiments, system agent core 810 includes one or more integrated memory controllers 814 to manage access to various external memory devices (not shown).

In some embodiments, one or more of the processor cores 802A to 802N include support for simultaneous multithreading. In such embodiment, the system agent core 810 includes components for coordinating and operating cores 802A to 802N during multi-threaded processing. System agent core 810 may additionally include a power control unit (PCU), which includes logic and components to regulate the power state of processor cores 802A to 802N and graphics processor 808.

In some embodiments, processor 800 additionally includes graphics processor 808 to execute graphics processing operations. In some embodiments, the graphics processor 808 couples with the set of shared cache units 806, and the system agent core 810, including the one or more integrated memory controllers 814. In some embodiments, a display controller 811 is coupled with the graphics processor 808 to drive graphics processor output to one or more coupled displays. In some embodiments, display controller 811 may be a separate module coupled with the graphics processor via at least one interconnect, or may be integrated within the graphics processor 808 or system agent core 810.

In some embodiments, a ring based interconnect unit 812 is used to couple the internal components of the processor 800. However, an alternative interconnect unit may be used, such as a point-to-point interconnect, a switched interconnect, or other techniques, including techniques well known in the art. In some embodiments, graphics processor 808 couples with the ring interconnect 812 via an I/O link 813.

The exemplary I/O link 813 represents at least one of multiple varieties of I/O interconnects, including an on package I/O interconnect which facilitates communication between various processor components and a high-performance embedded memory module 818, such as an eDRAM (or embedded DRAM) module. In some embodiments, each of the processor cores 802 to 802N and graphics processor 808 use embedded memory modules 818 as a shared Last Level Cache.

In some embodiments, processor cores 802A to 802N are homogenous cores executing the same instruction set architecture. In another embodiment, processor cores 802A to 802N are heterogeneous in terms of instruction set architecture (ISA), where one or more of processor cores 802A to 802N execute a first instruction set, while at least one of the other cores executes a subset of the first instruction set or a different instruction set. In one embodiment processor cores 802A to 802N are heterogeneous in terms of microarchitecture, where one or more cores having a relatively higher power consumption couple with one or more power cores having a lower power consumption. Additionally, processor 800 can be implemented on one or more chips or as an SoC integrated circuit having the illustrated components, in addition to other components.

Figure 9:
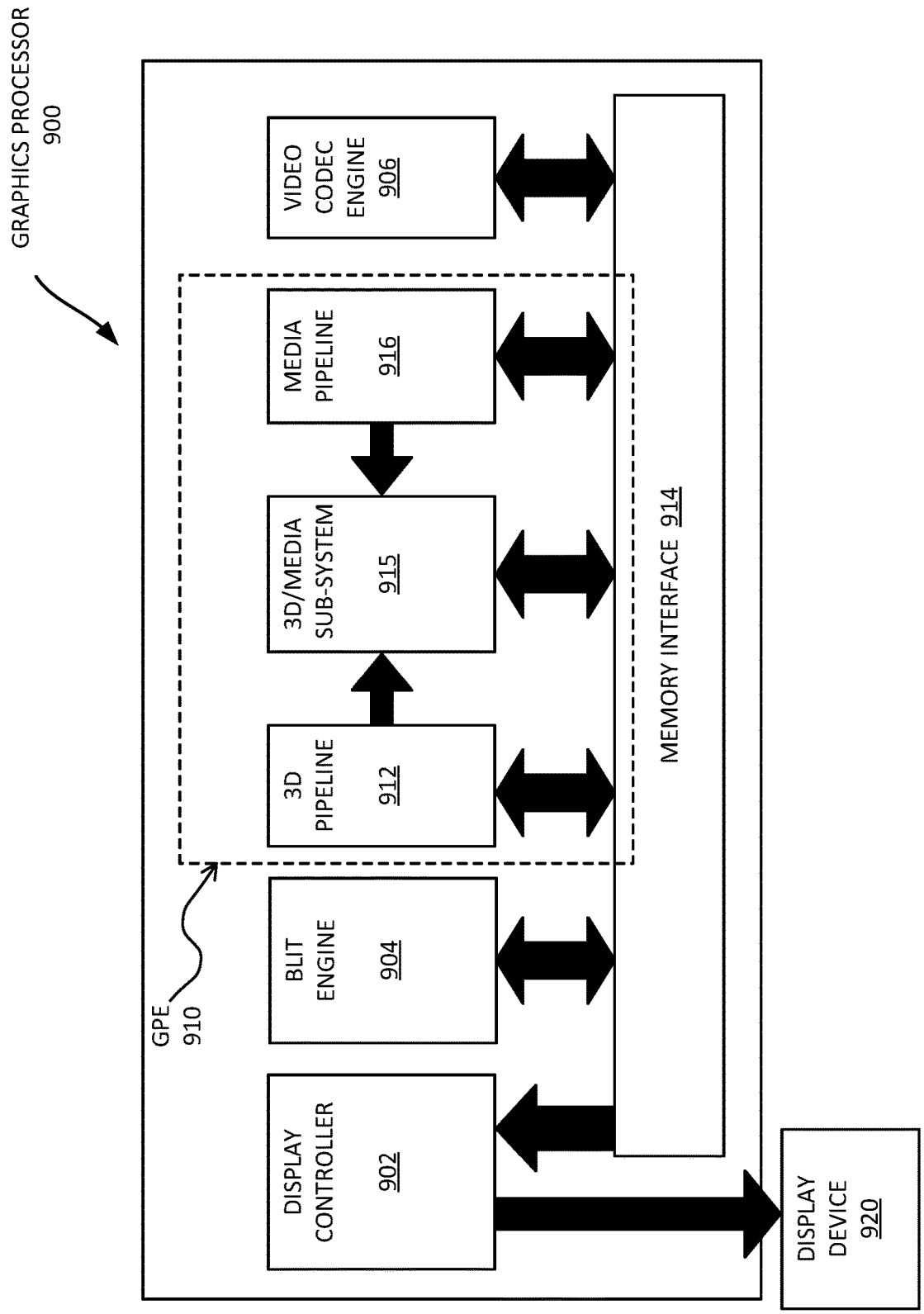
FIG. 9 is a block diagram of a graphics processor, according to an embodiment.

FIG. 9 is a block diagram of a graphics processor 900, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 900 includes a memory interface 914 to access memory. Memory interface 914 can be an interface to local memory, one or more internal caches, one or more shared external caches, and/or to system memory.

In some embodiments, graphics processor 900 also includes a display controller 902 to drive display output data to a display device 920. Display controller 902 includes hardware for one or more overlay planes for the display and composition of multiple layers of video or user interface elements. In some embodiments, graphics processor 900 includes a video codec engine 906 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 321M/VC-1, and Joint Photographic Experts Group (JPEG) formats such as JPEG, and Motion JPEG (MJPEG) formats.

In some embodiments, graphics processor 900 includes a block image transfer (BLIT) engine 904 to perform two-dimensional (2D) rasterizer operations including, for example, bit-boundary block transfers. However, in one embodiment, 9D graphics operations are performed using one or more components of graphics processing engine (GPE) 910. In some embodiments, graphics processing engine 910 is a compute engine for performing graphics operations, including three-dimensional (3D) graphics operations and media operations.

In some embodiments, GPE 910 includes a 3D pipeline 912 for performing 3D operations, such as rendering three-dimensional images and scenes using processing functions that act upon 3D primitive shapes (e.g., rectangle, triangle, etc.). The 3D pipeline 912 includes programmable and fixed function elements that perform various tasks within the element and/or spawn execution threads to a 3D/Media sub-system 915. While 3D pipeline 912 can be used to perform media operations, an embodiment of GPE 910 also includes a media pipeline 916 that is specifically used to perform media operations, such as video post-processing and image enhancement.

In some embodiments, media pipeline 916 includes fixed function or programmable logic units to perform one or more specialized media operations, such as video decode acceleration, video de-interlacing, and video encode acceleration in place of, or on behalf of video codec engine 906. In some embodiments, media pipeline 916 additionally includes a thread spawning unit to spawn threads for execution on 3D/Media sub-system 915. The spawned threads perform computations for the media operations on one or more graphics execution units included in 3D/Media sub-system 915.

In some embodiments, 3D/Media subsystem 915 includes logic for executing threads spawned by 3D pipeline 912 and media pipeline 916. In one embodiment, the pipelines send thread execution requests to 3D/Media subsystem 915, which includes thread dispatch logic for arbitrating and dispatching the various requests to available thread execution resources. The execution resources include an array of graphics execution units to process the 3D and media threads. In some embodiments, 3D/Media subsystem 915 includes one or more internal caches for thread instructions and data. In some embodiments, the subsystem also includes shared memory, including registers and addressable memory, to share data between threads and to store output data.

The following examples pertain to further embodiments. Example 1 includes an apparatus comprising: a configurable compute tile comprising a plurality of cryptocurrency mining engines; and first logic circuitry to cause deactivation of one or more cryptocurrency mining engines from the plurality of cryptocurrency mining engines based at least in part on a request for deactivation of the one or more cryptocurrency mining engines, wherein the first logic circuitry is to adjust a nonce search resolution for one or more active cryptocurrency mining engines of the plurality of cryptocurrency mining engines in response to the request for deactivation. Example 2 includes the apparatus of example 1, comprising second logic circuitry to generate the request for deactivation of the one or more cryptocurrency mining engines in response to a detected failure in the one or more cryptocurrency mining engines. Example 3 includes the apparatus of example 1, comprising second logic circuitry to generate the request for deactivation of the one or more cryptocurrency mining engines in response to a power consumption reduction request. Example 4 includes the apparatus of example 1, comprising request logic circuitry to generate the request for deactivation of the one or more cryptocurrency mining engines in response to a performance tuning request. Example 5 includes the apparatus of example 4, comprising second logic circuitry to generate the performance tuning request. Example 6 includes the apparatus of example 5, wherein the second logic circuitry comprises one or more of: an Operating System (OS), a Basic Input/Output System (BIOS), a device driver, and a software application. Example 7 includes the apparatus of example 5, wherein the second logic circuitry is to generate the performance tuning request at system start-up. Example 8 includes the apparatus of example 1, wherein the configurable compute tile comprises the first logic circuitry. Example 9 includes the apparatus of example 1, wherein logic circuitry comprises one of a system controller coupled to the configurable compute tile or engine configuration logic circuitry of the configurable compute tile. Example 10 includes the apparatus of example 9, wherein a processor comprises the plurality of cryptocurrency mining engines and at least one of the system controller and the engine configuration logic circuitry. Example 11 includes the apparatus of example 1, wherein a processor comprises the plurality of cryptocurrency mining engines and the configurable compute tile. Example 12 includes the apparatus of example 1, wherein the plurality of cryptocurrency mining engines each comprise a processor core.

Example 13 includes one or more non-transitory computer-readable media comprising one or more instructions that when executed on a processor configure the processor to perform one or more operations to cause: first logic circuitry to cause deactivation of one or more cryptocurrency mining engines from a plurality of cryptocurrency mining engines in a configurable compute tile based at least in part on a request for deactivation of the one or more cryptocurrency mining engines; and the first logic circuitry to adjust a nonce search resolution for one or more active cryptocurrency mining engines of the plurality of cryptocurrency mining engines in response to the request for deactivation. Example 14 includes the one or more computer-readable media of example 13, further comprising one or more instructions that when executed on the one processor configure the processor to perform one or more operations to cause second logic circuitry to generate the request for deactivation of the one or more cryptocurrency mining engines in response to a detected failure in the one or more cryptocurrency mining engines. Example 15 includes the one or more computer-readable media of example 13, further comprising one or more instructions that when executed on the one processor configure the processor to perform one or more operations to cause second logic circuitry to generate the request for deactivation of the one or more cryptocurrency mining engines in response to a power consumption reduction request. Example 16 includes the one or more computer-readable media of example 13, further comprising one or more instructions that when executed on the one processor configure the processor to perform one or more operations to cause request logic circuitry to generate the request for deactivation of the one or more cryptocurrency mining engines in response to a performance tuning request. Example 17 includes the one or more computer-readable media of example 16, further comprising one or more instructions that when executed on the one processor configure the processor to perform one or more operations to cause second logic circuitry to generate the performance tuning request. Example 18 includes the one or more computer-readable media of example 17, wherein the second logic circuitry comprises one or more of: an Operating System (OS), a Basic Input/Output System (BIOS), a device driver, and a software application. Example 19 includes the one or more computer-readable media of example 16, further comprising one or more instructions that when executed on the one processor configure the processor to perform one or more operations to cause the second logic circuitry to generate the performance tuning request at system start-up. Example 20 includes the one or more computer-readable media of example 13, wherein the configurable compute tile comprises the first logic circuitry.

Example 21 includes an apparatus comprising means to perform an operation as set forth in any preceding example. Example 22 includes machine-readable storage including machine-readable instructions, when executed, to implement an operation or realize an apparatus as set forth in any preceding example.

In this description, numerous specific details are set forth to provide a more thorough understanding. However, it will be apparent to one of skill in the art that the embodiments described herein may be practiced without one or more of these specific details. In other instances, well-known features have not been described to avoid obscuring the details of the present embodiments.

In various embodiments, one or more operations discussed with reference to FIG. 1 et seq. may be performed by one or more components (interchangeably referred to herein as "logic") discussed with reference to any of the figures.

In various embodiments, the operations discussed herein, e.g., with reference to FIG. 1 et seq., may be implemented as hardware (e.g., logic circuitry), software, firmware, or combinations thereof, which may be provided as a computer program product, e.g., including one or more tangible (e.g., non-transitory) machine-readable or computer-readable media having stored thereon instructions (or software procedures) used to program a computer to perform a process discussed herein. The machine-readable medium may include a storage device such as those discussed with respect to the figures.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
a configurable compute tile comprising a plurality of cryptocurrency mining engines; and
first logic circuitry to cause deactivation of one or more cryptocurrency mining engines from the plurality of cryptocurrency mining engines based at least in part on a request for deactivation of the one or more cryptocurrency mining engines,
wherein the first logic circuitry is to adjust a nonce search resolution for one or more active cryptocurrency mining engines of the plurality of cryptocurrency mining engines in response to the request for deactivation.

2. The apparatus of claim 1, comprising second logic circuitry to generate the request for deactivation of the one or more cryptocurrency mining engines in response to a detected failure in the one or more cryptocurrency mining engines.

3. The apparatus of claim 1, comprising second logic circuitry to generate the request for deactivation of the one or more cryptocurrency mining engines in response to a power consumption reduction request.

4. The apparatus of claim 1, comprising request logic circuitry to generate the request for deactivation of the one or more cryptocurrency mining engines in response to a performance tuning request.

5. The apparatus of claim 4, comprising second logic circuitry to generate the performance tuning request.

6. The apparatus of claim 5, wherein the second logic circuitry comprises one or more of: an Operating System (OS), a Basic Input/Output System (BIOS), a device driver, and a software application.

7. The apparatus of claim 5, wherein the second logic circuitry is to generate the performance tuning request at system start-up.

8. The apparatus of claim 1, wherein the configurable compute tile comprises the first logic circuitry.

9. The apparatus of claim 1, wherein first logic circuitry comprises one of a system controller coupled to the configurable compute tile or engine configuration logic circuitry of the configurable compute tile.

10. The apparatus of claim 9, wherein a processor comprises the plurality of cryptocurrency mining engines and at least one of the system controller and the engine configuration logic circuitry.

11. The apparatus of claim 1, wherein a processor comprises the plurality of cryptocurrency mining engines and the configurable compute tile.

12. The apparatus of claim 1, wherein the plurality of cryptocurrency mining engines each comprise a processor core.

13. One or more non-transitory computer-readable media comprising one or more instructions that when executed on a processor configure the processor to perform one or more operations to cause:
first logic circuitry to cause deactivation of one or more cryptocurrency mining engines from a plurality of cryptocurrency mining engines in a configurable compute tile based at least in part on a request for deactivation of the one or more cryptocurrency mining engines; and
the first logic circuitry to adjust a nonce search resolution for one or more active cryptocurrency mining engines of the plurality of cryptocurrency mining engines in response to the request for deactivation.

14. The one or more non-transitory computer-readable media of claim 13, further comprising one or more instructions that when executed on the one processor configure the processor to perform one or more operations to cause second logic circuitry to generate the request for deactivation of the one or more cryptocurrency mining engines in response to a detected failure in the one or more cryptocurrency mining engines.

15. The one or more non-transitory computer-readable media of claim 13, further comprising one or more instructions that when executed on the one processor configure the processor to perform one or more operations to cause second logic circuitry to generate the request for deactivation of the one or more cryptocurrency mining engines in response to a power consumption reduction request.

16. The one or more non-transitory computer-readable media of claim 13, further comprising one or more instructions that when executed on the one processor configure the processor to perform one or more operations to cause request logic circuitry to generate the request for deactivation of the one or more cryptocurrency mining engines in response to a performance tuning request.

17. The one or more non-transitory computer-readable media of claim 16, further comprising one or more instructions that when executed on the one processor configure the processor to perform one or more operations to cause second logic circuitry to generate the performance tuning request.

18. The one or more non-transitory computer-readable media of claim 17, wherein the second logic circuitry comprises one or more of: an Operating System (OS), a Basic Input/Output System (BIOS), a device driver, and a software application.

19. The one or more non-transitory computer-readable media of claim 17, further comprising one or more instructions that when executed on the one processor configure the processor to perform one or more operations to cause the second logic circuitry to generate the performance tuning request at system start-up.

20. The one or more non-transitory computer-readable media of claim 13, wherein the configurable compute tile comprises the first logic circuitry.

* * * * *